United States Patent
Gu et al.

(10) Patent No.: US 10,614,337 B2
(45) Date of Patent: Apr. 7, 2020

(54) INFORMATION PROCESSING APPARATUS AND INFORMATION PROCESSING METHOD

(71) Applicant: Sony Corporation, Tokyo (JP)

(72) Inventors: Shuhang Gu, Beijing (CN); Chongyu Chen, Beijing (CN); Lei Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 15/657,344

(22) Filed: Jul. 24, 2017

(65) Prior Publication Data
US 2018/0075315 A1 Mar. 15, 2018

(30) Foreign Application Priority Data
Sep. 12, 2016 (CN) .......................... 2016 1 0818143

(51) Int. Cl.
| | |
|---|---|
| *G06K 9/46* | (2006.01) |
| *G06T 7/00* | (2017.01) |
| *G06T 5/50* | (2006.01) |
| *G06K 9/62* | (2006.01) |
| *G06T 7/593* | (2017.01) |

(52) U.S. Cl.
CPC .............. *G06K 9/46* (2013.01); *G06K 9/6255* (2013.01); *G06T 5/50* (2013.01); *G06T 7/0002* (2013.01); *G06T 7/593* (2017.01); *G06K 2009/4695* (2013.01); *G06T 2207/10028* (2013.01); *G06T 2207/20081* (2013.01); *G06T 2207/30168* (2013.01)

(58) Field of Classification Search
USPC ........................................................ 382/154
See application file for complete search history.

(56) References Cited

U.S. PATENT DOCUMENTS

| | | | |
|---|---|---|---|
| 9,292,969 B2* | 3/2016 | Laffargue ................ G06T 17/20 |
| 2006/0269159 A1* | 11/2006 | Kim .......................... G06T 5/50 382/256 |
| 2009/0067707 A1* | 3/2009 | Sim ..................... G06K 9/00208 382/154 |
| 2009/0201384 A1* | 8/2009 | Kang ..................... H04N 5/247 348/222.1 |

(Continued)

OTHER PUBLICATIONS

Leonid I Rudin, et al., "Nonlinear total variation based noise removal algorithms", Physica D, 1992, 10 pages.

*Primary Examiner* — Jerome Grant, II
(74) *Attorney, Agent, or Firm* — Xsensus LLP

(57) ABSTRACT

The disclosure relates to information processing apparatus and information processing method. The information processing apparatus according to an embodiment includes a processing circuitry configured to acquire a first depth image, a second depth image and an intensity image having a pixel correspondence with each other, wherein the second depth image being superior to the first depth image in terms of image quality. The processing circuitry is further configured to perform a training process based on the first depth image, the second depth image and the intensity image to derive parameters of an analysis sparse representation model modeling a relationship among the first depth image, the second depth image and the intensity image. The processing circuitry is configured to output the derived parameters.

13 Claims, 9 Drawing Sheets

(56) References Cited

U.S. PATENT DOCUMENTS

| | | | |
|---|---|---|---|
| 2010/0111358 A1* | 5/2010 | Chai | G06K 9/00335 |
| | | | 382/103 |
| 2012/0082346 A1* | 4/2012 | Katz | G01S 17/107 |
| | | | 382/106 |
| 2015/0235351 A1* | 8/2015 | Mirbach | G06T 5/002 |
| | | | 382/154 |
| 2016/0063715 A1* | 3/2016 | Wan | G06T 3/40 |
| | | | 382/195 |
| 2018/0059225 A1* | 3/2018 | Zhu | G01S 17/023 |
| 2018/0205926 A1* | 7/2018 | Mogalapalli | G06T 7/521 |
| 2018/0316836 A1* | 11/2018 | Lin | H04N 5/2258 |
| 2018/0349319 A1* | 12/2018 | Kamilov | G06T 5/002 |
| 2019/0004667 A1* | 1/2019 | Barth | G06F 3/0418 |
| 2019/0012818 A1* | 1/2019 | Fine | G06T 11/60 |

\* cited by examiner

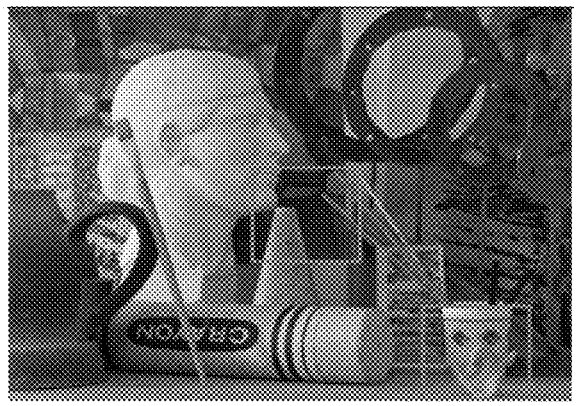
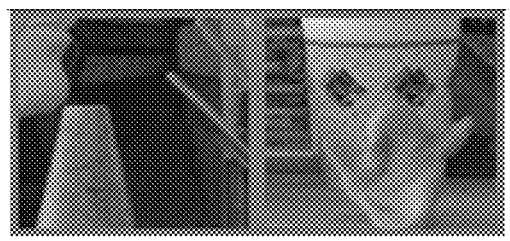
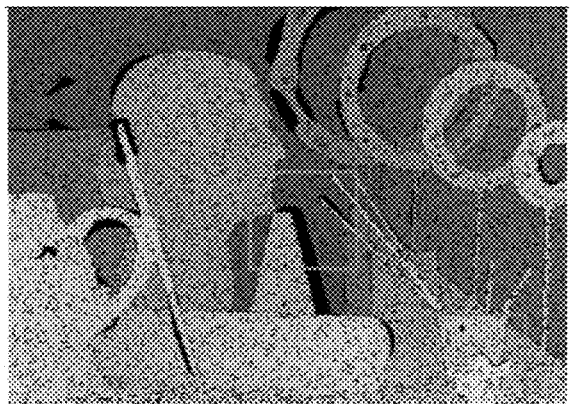
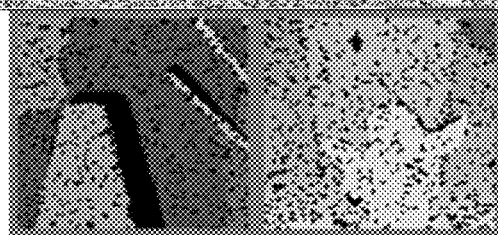
Fig. 14A
Fig. 14B
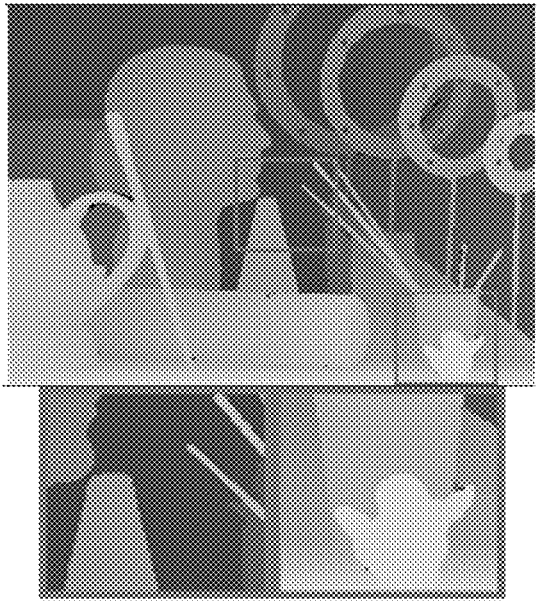
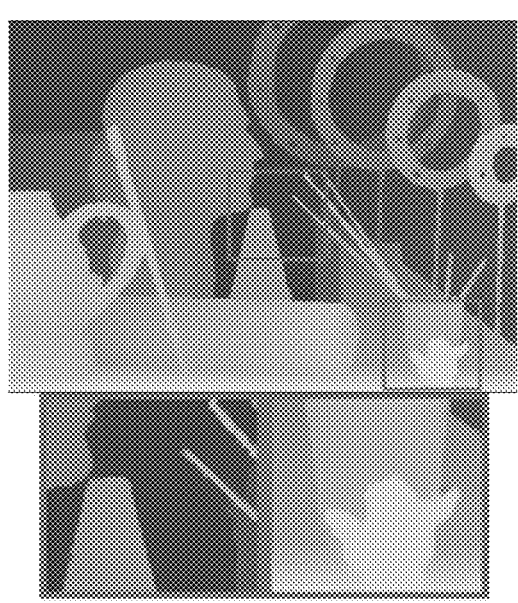
Fig. 14C
Fig. 14D

US 10,614,337 B2

INFORMATION PROCESSING APPARATUS AND INFORMATION PROCESSING METHOD

CROSS REFERENCE TO RELATED APPLICATIONS

The application is related to Chinese Patent Application No. 201610818143.2 filed on Sep. 12, 2016 and entitled "Information processing apparatus and information processing method", the content of which is incorporated herein by reference.

TECHNICAL FIELD

The present disclosure generally relates to information processing, and more particularly, to information processing apparatus and information processing method related to guided depth image restoration.

BACKGROUND

Depth image plays an important role in many applications such as robot science, human-machine interaction and augmented reality. Common depth sensing is mainly based on stereo measurement or laser measurement. Recently, consumer-grade depth sensing products such as RGB-D (color image-depth image) camera and time of flight (ToF) distance sensor are widely applied. However, the depth image obtained by the consumer-grade depth sensor may have certain deficiency in terms of image quality, for example, it may have problems of low resolution, high noise level and depth value loss (that is, depth value at certain position in a depth map is null, also referred to as a hole of depth value). Guided depth image restoration provides means for improving quality of the depth image, in which the image quality of the depth image is improved based on information on an intensity image such as an RGB image.

SUMMARY

An important aspect of guided depth image restoration is to model a relationship between an intensity image and a depth image, and the above modeling is performed based on parameters manually set in the existing methods for guided depth image restoration. The existing methods for guided depth image restoration generally can be classified into filtering-based method, optimizing-based method and dictionary-learning-based method.

For example, by introducing RGB values into a filter weight calculation process, the filtering-based method has been applied to RGB guided depth restoration problem. However, the manner is not ideal in terms of high-precision depth image restoration, which needs to set parameters manually to adapt different images. In addition, generally only the relationship between two pixels is formulated in the filtering-based method, such a first order relationship is less effective for measuring a complex local structure.

Another type of method is aimed to convert the depth restoration problem into an objective function, and use an optimization solution as a result of restoration. Optimization functions used in these methods generally consist of function forms manually set and parameters manually set. These functions and parameters manually set are generally simple, thus cannot model a relationship between a degradation depth image, a high-quality depth image and an intensity image well.

Statistical dependence between a depth image block and an intensity image block is modeled using a dictionary atom based on the dictionary-learning-based method. With the method, sparse reconstruction is performed on the depth image block and the intensity image block simultaneously, and it is necessary to use the dictionary atom having a high-dimension feature vector. Higher dimension means more atoms, and thus there is big calculation load during a training stage and a testing stage. In addition, a data-driven training strategy is used in the dictionary-learning-based method. The dictionary atom is trained to represent the intensity image block and the depth image block by the same coefficient, the strategy results in inconsistent coefficients between the training stage and the testing stage because a respective high-quality depth image block is unknown during the testing stage.

Embodiments of the present disclosure are proposed for solving at least a part of the above problems of guided depth image restoration.

A brief summary of the embodiments according to the present disclosure is given hereinafter in order to provide a basic understanding of certain aspects of the present disclosure. It should be understood that, the following summary is not an exhaustive summary of the present disclosure. It is neither intended to determine a key or important part of the present disclosure, nor intended to limit scope of the present disclosure. The object thereof is merely is to give certain concepts in a simplified form, which is used as a preamble of more detailed description discussed later.

According to an embodiment, an information processing apparatus is provided, which includes a processing circuitry. The processing circuitry is configured to acquire a first depth image, a second depth image and an intensity image having a pixel correspondence with each other, wherein the second depth image being superior to the first depth image in terms of image quality. The processing circuitry is further configured to perform a training process based on the first depth image, the second depth image and the intensity image to derive parameters of an analysis sparse representation model modeling a relationship among the first depth image, the second depth image and the intensity image. The processing circuitry is configured to output the derived parameters.

According to another embodiment, an information processing method is provided. The information processing method includes a step of acquiring a first depth image, a second depth image and an intensity image having a pixel correspondence with each other, wherein the second depth image being superior to the first depth image in terms of image quality. The method further includes a step of performing a training process based on the first depth image, the second depth image and the intensity image to derive parameters of an analysis sparse representation model modeling a relationship among the first depth image, the second depth image and the intensity image. The method further includes a step of outputting the derived parameters.

According to yet another embodiment, an information processing apparatus is provided. The information processing apparatus includes a processing circuitry. The processing circuitry is configured to acquire parameters of an analysis sparse representation model modeling a relationship among a first depth image, a second depth image and an intensity image having a pixel correspondence with each other, wherein the second depth image being superior to the first depth image in terms of image quality, and the parameters being derived by a training process performed based on training images. The processing circuitry is further configured to acquire an input depth image and an input intensity image; and derive an estimated depth image superior to the input depth image in terms of image quality based on the input depth image and the input intensity image using the model.

According to still another embodiment, an information processing method is provided, which includes a step of acquiring parameters of an analysis sparse representation model modeling a relationship among a first depth image, a second depth image and an intensity image having a pixel correspondence with each other, wherein the second depth image being superior to the first depth image in terms of image quality, and the parameters being derived by a training process performed based on training images. The method further includes a step of acquiring an input depth image and an input intensity image; and a step of deriving an estimated depth image superior to the input depth image in terms of image quality based on the input depth image and the input intensity image using the model.

According to embodiments of the present disclosure, a model representing a complex relationship between a depth image and an intensity can be obtained, thereby a guided depth image restoration can be performed more accurately.

BRIEF DESCRIPTION OF THE DRAWINGS

The present disclosure may be better understood by referring to the description given in conjunction with the drawings hereinafter, in which same or similar components are represented by same or similar reference numeral in all the drawings. Together with the following detailed description, the drawings are incorporated in the specification and constitute a part of the specification, and are intended to further exemplify preferred embodiments of the present disclosure and to explain the principles and advantages of the present disclosure. In the drawings:

FIG. 14A to FIG. 14D show examples of an effect of hole-filling obtained by a solution according to an example embodiment of the present disclosure.

DETAILED DESCRIPTION OF THE EMBODIMENTS

Figure 1:
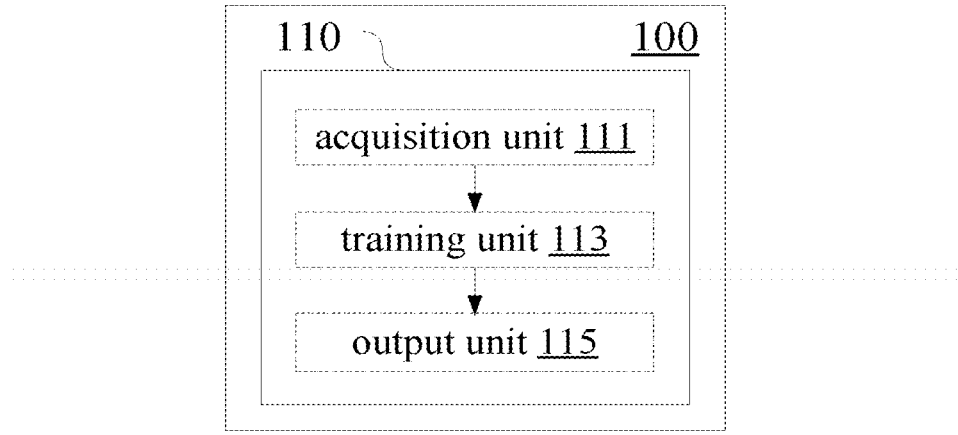
FIG. 1 is a block diagram showing a configuration example of an information processing apparatus according to an embodiment of the present disclosure.

Next, an embodiment of the present disclosure is described by referring to the drawings. Elements and features described in one of the drawings or one embodiment of the present disclosure may be combined with elements and features illustrated in one or more of other drawings or embodiments. It should be noted that, for the purpose of clarity, indication and description of components and processing irrelevant to the present disclosure and known by those skilled in the art are omitted in the drawings and the explanation.

Figure 11:
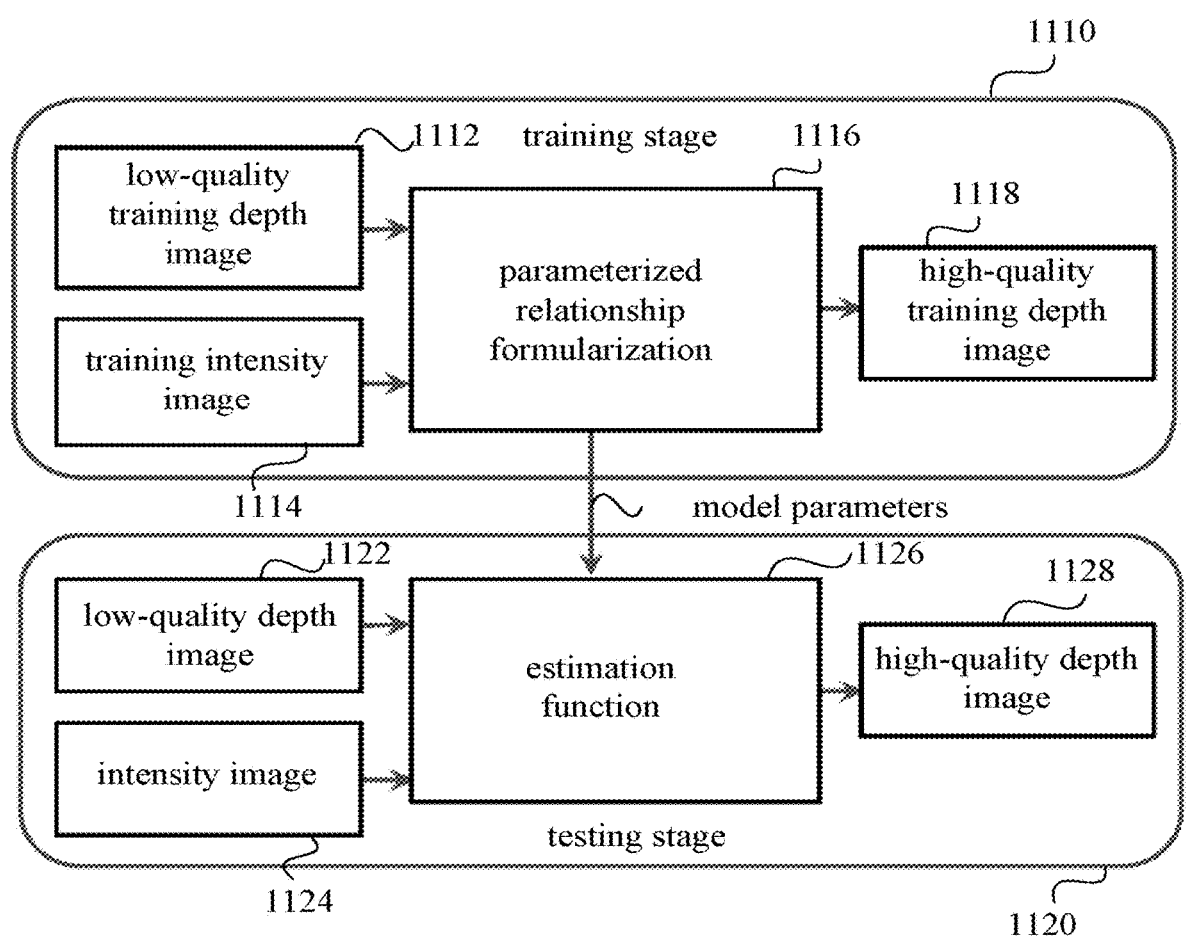
FIG. 11 is a schematic diagram for illustrating a process example of a training stage and a testing stage of a model involved in an embodiment of the present disclosure.

Before describing a specific embodiment of the present disclosure, firstly, an overall scheme is briefly described by referring to FIG. 11. As shown in FIG. 11, the proposed scheme involves a training stage 1110 and a testing stage 1120. During the training stage, a training process is performed based on a known low-quality training depth image 1112, a known training intensity image 1114 and a known high-quality training depth image 1118 to derive a model modeling a parameterized relationship between the low-quality training depth image 1112, the training intensity image 1114 and the high-quality training depth image 1118, i.e., a parameterized relationship formularization 1116. A result obtained by the training process may include parameters of the model. During the testing stage 1120 (in which stage the trained model is applied), the high-quality depth image 1128 is derived from the low-quality depth function 1122 and the intensity image 1124 by an estimation function 1126 using the parameters derived during the training stage. The low-quality depth image 1122 and the intensity image 1124 include, for example, RGB-D data which may either be captured during the testing stage in real time, or come from a pre-stored file. Here, "low-quality" includes, for example, low resolution, high noise or more holes. Correspondingly, "high-quality" includes, for example, high resolution, low noise or less holes.

It is noted that, the training stage and the testing stage may be performed by a same apparatus, or performed by different apparatuses respectively. In a case of being performed by different apparatuses, for example, the training stage may be performed by an apparatus manufacturer during an apparatus manufacturing stage, and the testing stage may be performed on user side.

For example, the information processing apparatus may be implemented as a personal computer (such as a desktop computer and a laptop computer), a work station, a game machine (such as a motion sensing game machine), a television, a mobile terminal (such as a smart phone, a tablet computer and a portable game terminal) or a camera device (such as a camera and a monitor). However, the application scope of embodiments of the present disclosure is not limited to the above aspects, and may be applied to any apparatus capable of obtaining an intensity image and a depth image, or an apparatus coupled in communication with or electrically coupled with the apparatus capable of obtaining the intensity image and the depth image to process the depth image and the intensity image.

FIG. 1 shows a configuration example of an information processing apparatus 100 according to an embodiment of the present disclosure. The information processing apparatus according to the embodiment corresponds to the above training process, i.e., a process of deriving parameters of a model based on training images, and the information processing apparatus 100 may be implemented as a manufacturer equipment or a user equipment.

As shown in FIG. 1, the information processing apparatus 100 according to the embodiment includes a processing circuitry 110. For example, the processing circuitry 110 may be implemented as a particular chip, a chipset, a central processing unit (CPU) or the like.

The processing circuitry 110 includes an acquisition unit 111, a training unit 113 and an output unit 115. It should be noted that, although the acquisition unit 111, the training unit 113 and the output unit 115 are shown in a form of a functional block in the drawing, it should be understood that, functions of the acquisition unit 111, the training unit 113 and the output unit 115 may also be realized by the processing circuitry 110 as a whole, and not necessarily realized by actual discrete components of the processing circuitry 110. In addition, although the processing circuitry 110 is shown by one block in the diagram, the information processing apparatus 100 may include multiple processing circuitries, and functions of the acquisition unit 111, the training unit 113 and the output unit 115 can be distributed among multiple processing circuitries, so that multiple processing circuitries perform these functions by cooperation.

The acquisition unit 111 is configured to acquire a first depth image, a second depth image and an intensity image having a pixel correspondence with each other, wherein the second depth image being superior to the first depth image in terms of image quality. Hereinafter, the first depth image may also be referred to as a low-quality depth image, and the second depth image may also be referred to as a high-quality depth image.

The pixel correspondence between the depth image and the intensity image means that a specific pixel in the intensity image and a corresponding pixel in the depth image correspond to the same object region captured simultaneously. The pixel correspondence between the intensity image and the depth image may be determined by camera calibration technology, and the simultaneous acquisition may be ensured by a hardware synchronization circuitry. For example, the intensity image and the high-quality depth image are acquired by an intensity image capturing device and a high-quality depth image capturing device respectively.

The low-quality depth image may be obtained by performing a degradation process on the high-quality depth image in terms of image quality.

As mentioned above, for example, the image quality may include one or more of resolution, hole level and noise level. Correspondingly, a degradation process may be performed on the high-quality depth image in terms of resolution, hole level or noise level to obtain a respective low-quality depth image.

Next, descriptions of example manners are given on how to perform the degradation process in terms of resolution, hole level and noise level to generate the low-quality depth image:

(1) Resolution

Given an intensity image (such as an RGB image) and a corresponding high-resolution depth image, multiple image blocks are extracted from the intensity image and the high-resolution depth image correspondingly (for example, each image block has 72×72 pixels), and down-sampling is performed on each of the image blocks of the depth image to obtain a low-resolution image block. Intensity image blocks and corresponding low-resolution depth image blocks may serve as a training image data set, and these training images may be used to determine parameters of a corresponding model, for improving the resolution of a depth image.

(2) Hole Level

A hole of a depth map refers to a part in the depth map which is lack of a depth value, and the hole level being high means that the depth map has more parts lack of the depth value.

Given a depth image and a corresponding depth image, multiple image blocks are extracted from the intensity image and the depth image correspondingly (for example, each image block has 72×72 pixels), and a hole is generated by setting a depth value of a certain part of the depth image block to null. Intensity image blocks and corresponding depth image blocks with holes generated may be used as a training image data set, and these training images may be used to determine parameters of a model for hole-filling of a depth image.

(3) Noise Level

Given an intensity image and a corresponding depth image, multiple image blocks are extracted respectively from the intensity image and the depth image correspondingly (for example, each image block has 72×72 pixels), and a specific type of noise (such as white Gaussian noise) is generated in the depth image blocks. Intensity image blocks and corresponding depth image blocks with noise generated may be used as a training image data set, and these training images may be used to determine parameters of a model for noise reduction in a depth image having a corresponding type of noise, for example.

It should be understood that, the present disclosure is not limited to specific details in the above example, and specific settings may be selected based on specific applications and requirements.

In addition, the low-quality depth image and the high-quality depth image may also be acquired by image acquisition apparatuses with different configurations respectively. The image acquisition apparatuses with different configurations may be different apparatuses with different image acquisition qualities, or apparatuses of the same kind but adopting different parameter settings (such as different resolution settings).

For example, a high-quality image and a low quality image may be obtained by different calibrated camera devices simultaneously in the case that depth images with different qualities are acquired by using different apparatuses. In addition, the high-quality image and the low-quality image may be obtained by the same camera device in the case that the subject is static. For example, the intensity image and high-quality (or low-quality) depth image may be captured by the image capturing device, and the low-quality (or high-quality) depth image is obtained after changing the configuration of the image capturing device.

In the case that a first depth image, a second depth image and an intensity image as training images are obtained, the training unit 113 is configured to perform a training process based on the first depth image, the second depth image and the intensity image to derive parameters of an analysis sparse representation model modeling a relationship among the first depth image, the second depth image and the intensity image. In other words, the trained model can be used to restore the high-quality depth image based on the intensity image and the low-quality depth image.

An analysis sparse representation model has capability of modeling a complex local structure, and has been successfully applied in solving the problem of single natural image restoration, e.g., restoring an intensity image based on an intensity image.

In addition, the dictionary-learning-based method mentioned previously uses a synthesis sparse representation model. In contrast, in the training process of the embodiment, parameters of the analysis sparse representation model are to be derived. Here, the synthesis sparse representation model and the analysis sparse representation model are explained briefly for ease of understanding the difference therebetween. In the synthesis sparse representation model, it is assumed that a signal x can be represented as a linear combination of a few atoms selected from a dictionary D, that is, $x=D\alpha$ (where $\alpha$ is sparse), while in the analysis sparse representation model, a representation coefficient is generated by multiplication, and it is assumed the coefficient is sparse, that is, $\beta=Px$ (where $\beta$ is sparse). The dictionary-learning-based method models multiple groups of images by requiring that there is a common representation coefficient between multiple groups of images. According to the embodiment of the present disclosure, an image is modeled based on an analysis representation model, i.e., by a response Px (where P represents a filter) of a filter applied to a signal, which is essentially different from the dictionary-learning-based method. Next, the explanation of the embodiment of the present disclosure is continued.

Guided depth image restoration performs restoration of a depth image with the guidance of an intensity image. Accordingly, local structural information of the intensity image needs to be introduced into the model. The model may include a weight generating function for generating a weight based on the intensity image. More particularly, the weight generating function can be used for affecting the regularization of depth filter response based on structural information in the intensity image.

According to an embodiment, the model may include a summation of a fidelity term and one or more regularization terms, where each of the regularization terms includes a respective penalty function and a respective weight generating function. For example, the model may in a form of the following equation:

$$\min_x E(x) = \Gamma(x,y) + \Sigma_i \langle w_i(g;\beta_i), \rho_i(P_i x;\alpha_i) \rangle, \quad \text{Equation (1)}$$

where x represents the high quality depth image, y represents the low quality depth image, g represents the intensity image (also can be referred to as guiding image), $\Gamma(x,y)$ represents the fidelity term, i is the index of regularization term, $\langle \cdot,\cdot \rangle$ represents an inner product, $w_i$ represents the weight generating function, $\beta_i$ is a parameter of the weight generating function, $\rho_i$ represents the penalty function, $P_i x$ represents a filter response, and $\alpha_i$ is a parameter of the penalty function.

Parameters to be derived by the training unit 113 may include a parameter of each of the weight generating functions and a parameter of each of the penalty functions. For the model represented by Equation (1), the parameters to be derived may include parameter $\beta_i$ of the weight generating function $w_i$ and parameter $\alpha_i$ of the penalty function $\rho_i$.

Next, with a model in an exemplary form of Equation (1) as an example, an exemplary process is explained in which the training unit 113 performs a training process based on the training images to derive parameters of an analysis sparse representation model. It should be understood that, specific forms and details given in the following example are explanatory rather than restrictive.

In Equation (1), the fidelity term $\Gamma(x,y)$ describes a degradation from the high-quality depth image x to the low-quality depth image y, and the weight $w_i$ is a column vector associated with each pixel of the intensity image g and is controlled by parameter $\beta_i$. $\rho_i(P_i x)$ is a column vector derived by applying the penalty function $\rho_i(\cdot)$ to $P_i x$ corresponding to the filter point by point. $P_i$ is a highly sparse matrix, which can be implemented as a two-dimensional convolution of the image x and a filter core $p_i$, that is $P_i x = p_i \otimes x$.

Next, more specific exemplary forms of fidelity term $\Gamma(x,y)$, penalty function $\rho_i(P_i x)$ and weight generating function $w_i(g; \beta_i)$ are explained in more details.

As described above, the fidelity term $\Gamma(x,y)$ reflects a degradation model between the low-quality depth image y and the high-quality depth image x. Taking the above-described applications of resolution improving (up-sampling) and hole-filling as an example, the fidelity term $\Gamma(x,y)$ may be in the form indicated by Equation (2) below:

$$\Gamma(x, y) = \frac{\tau}{2} \|M^{1/2}(x-y)\|_2^2 \quad \text{Equation (2)}$$

where M is a diagonal matrix, and $\tau$ is related to the intensity of fidelity force. For example, for resolution up-sampling application, a diagonal element of M indicates a corresponding point between the high-quality depth image x and the low-quality depth image y. In a case of the application of hole-filling, M may be a binary matrix which only controls a difference between observation points.

Methods of using a sparse penalty function for a filter response to improve piecewise smooth output already exist (for example, see document [1]: "Rudin, L. I., Osher, S., Fatemi, E.: Nonlinear total variation based noise removal algorithms. Physica D: Nonlinear Phenomena, 1992" and document [2]: "Roth, S., Black, M. J.: Fields of experts. International Journal of Computer Vision, 2009"). However, a complex relationship between the depth image and the intensity image cannot be modeled by the manual-set penalty function used in these methods well.

In contrast, according to the solution of the embodiment of the present disclosure, a nonlinear penalty function $\rho_i(\cdot)$ is parameterized, and the penalty function is learned based on training data, thereby improving the modeling of the complex relationship between the depth image and the intensity image.

Specifically, the model may be represented as a first derivative of the penalty function, that is, $\phi_i(\cdot) = \rho'_i(\cdot)$. To model the complex relationship between the depth image and the intensity image, M gaussian radial basis functions (RBF) may be used to fit the function $\phi_i(\cdot)$:

$$\Phi_i(z) = \sum_j^M \alpha_{i,j} \exp\left(\frac{-(z-\mu_j)^2}{2\gamma_j^2}\right), \quad \text{Equation (3)}$$

where $\mu_j$ is the center of a j-th RBF core, $\gamma_j$ is the j-th scaling factor, and $\alpha_{i,j}$ is a corresponding fitting coefficient. Different fitting coefficients correspond to different penalty functions. An optimal penalty function is derived by updating $\alpha$ continually in the training process. This form is very flexible, allowing modeling the complex relationship between the depth image and the intensity image.

In the above example model, the weight generating function $w_i(g; \beta_i)$ is introduced for guiding regularization of a depth filter response based on structural information in the intensity image. Although the intensity image and the depth image are based on the same scenario and have a certain structural dependency, a value of the intensity image and a value of the depth image have different physical meanings. The weight function should be able to avoid such intensity information regardless of a structure, and extract structural information helpful for positioning an edge in the depth image.

A weighted graph may be generated by the function represented by the following Equation (4) based on the intensity image g:

$$W_i(m,n) = \exp(-\langle \beta_i, e_{m,n} \rangle^2), \quad \text{Equation 4}$$

where $W_i(m, n)$ is a weight at a position $(m, n)$ in the weighted graph, $$e_{m,n} = \frac{R_{m,n} g}{\|R_{m,n} g\|_2},$$

$R_{m,n}$ represents an operation of extracting a local image block at the position (m, n) in the image g, and $\beta_i$ represents a corresponding linear filter for extracting a structural feature, with the structural information in the intensity image being extracted by performing linear weighting on each point in the normalized intensity image block $e_{m,n}$. Effect from different intensities is avoided by performing local normalization on the intensity image. The function form $W_i(m,n) = \exp(-(\bullet)^2)$ in Equation (4) renders the weighted function to be a stepwise even function with a dramatic change with respect to a filter response, which is beneficial for the weighted graph to focus on structural changes in the intensity image rather than changes in the intensity value.

Parameters may be learned based on the training data by using example functions represented in the above Equations (2) to (4), for example, $\{\alpha_i, \beta_i, p_i\}$. $\alpha_i$ is a parameter for controlling the specific form of the penalty function $\rho_i(\bullet)$, $\beta_i$ is a parameter for controlling the form of the weighted function $w_i$, and $p_i$ is the i-th filter.

However, those skilled in the art can understand that, the present disclosure is not limited specific function forms and parameters given in the above example. The generating function $W_i(m,n)$ of the weighted graph may be a nonnegative function with a parameter being $\beta$ and the intensity image g as input, and local structural information in the intensity map is extracted by the parameter $\beta$, which may have various specific function forms such as $\langle \beta_i, e_{m,n} \rangle^2$. According to specific applications, different function forms may be used, and corresponding parameters can be derived based on the training data.

The output unit 115 is configured to output the derived parameters. For example, the outputted parameters may be provided to and stored in a user equipment so that the user equipment can perform depth image optimization processing using the parameters.

As described above, the depth image may be optimized in terms of different image qualities. Correspondingly, the training unit 113 may be configured to derive model parameters for different image quality optimizations using different training image sets.

Correspondingly, according to an embodiment, the training unit 113 is configured to derive a respective parameter using a respective loss function with respect to each of multiple image qualities. The training mode may be referred to as task-driven training mode, and the derived model parameter may be referred to as task-specific parameter.

In other words, it is assumed that there are S groups of training samples (respectively corresponding to optimizations of S types of different image qualities) $\{y^{(s)}, x_g^{(s)}\}_{s=1}^{S}$, where $y^{(s)}$ represents a low-quality image, and $x_g^{(s)}$ represents a high-quality image, and the model parameters may be derived by the task-driven training mode in the following equation:

$$\theta^* = \operatorname{argmin}_\theta \sum_{s=1}^{S} \operatorname{loss}(x_\theta^{(s)}(\theta), x_g^{(s)}) \quad \text{Equation (5)}$$

$$\text{s.t.} \quad x_\theta^{(s)}(\theta) = f(y^{(s)}; \theta),$$

where the generalized function $x_\theta^{(s)}(\theta) = f(y^{(s)}; \theta)$ represents a process of generating an estimated image $x_\theta^{(s)}$ using the proposed model with input data $y^{(s)}$ and model parameter $\theta$. An optimal parameter $\theta$ for a specific task is learned using a loss function $\operatorname{loss}(x_\theta^{(s)}(\theta), x_g^{(s)})$ between the high-quality image $x_g^{(s)}$ specific to the task (for example, resolution improving, hole-filling and noise reduction) and the estimated image $x_\theta^{(s)}(\theta)$ related to the parameter.

In addition, the weighted sparse representation model in Equation (5) may result in a problem of non-convex minimization with multiple parameters $\{\alpha_i, \beta_i, p_i\}_{i=1...N}$. For ease of solution of the problem, according to an embodiment, the training process performed by the training unit 113 may include a stage-wise training process. Correspondingly, the output unit 115 may be configured to output the parameters derived by each stage of training process.

In the stage-wise training process, a corresponding group of parameters may be derived by each stage of training. In addition, according to an embodiment, the parameters derived by each stage of training process may further include a parameter related to an estimation reliability of the stage of training process.

The stage-wise training process is explained also by taking the model described above with reference to Equations (1) to (4) as an example.

According to an example embodiment, the above Equation (1) may be solved by using a gradient descent method, wherein each stage-wise operation may be represented by the following equation:

$$x_{t+1} = x_t - (\nabla_x \Gamma(x_t, y) + \Sigma_i P_{t,i}^T \operatorname{diag}(w_{t,i}) \phi_{t,i}(P_{t,i} x_t)) \quad \text{Equation (6A)}$$

where t is the index of stage, $w_{t,i}$ is the i-th weight generating function in the t-th stage, $\operatorname{diag}(w_{t,i})$ is a square matrix with diagonal elements being vector $w_{t,i}$, $x_t$ is an estimation of x in the (t−1)-th stage, $\nabla_x \Gamma(x_t, y)$ is the derivative of the fidelity term, $P_{t,i}^T$ represents a filter operation after performing a horizontal up-down flip on a filter, and function $\phi_{t,i}$ is the derivative of the penalty function $\rho_i$.

In the case that the fidelity term has an example form as the above Equation (2), Equation (6A) may be further represented as:

$$x_{t+1} = x_t - (\tau_t M(x_t - y) + \Sigma_i P_{t,i}^T \mathrm{diag}(w_{t,i}) \phi_{t,i}(P_{t,i} x_t)) \quad \text{Equation (6B)}$$

where $\tau_t$ represents a parameter related to an estimation reliability of the stage of training process.

A loss between the current estimation value and the true value may be measured using a square error. Hence, the stage-wise parameters may be learned in a greedy manner as shown in the following Equation (7):

$$\{\tau_t, \alpha_{t,i}, \beta_{t,i}, p_{t,i}\} = \arg\min_\theta \frac{1}{2} \sum_{s=1}^{S} \|x_{t+1}^{(s)} - x_g^{(s)}\|_2^2 \quad \text{Equation (7)}$$

s.t.

$$x_{t+1}^{(s)} = x_t^{(s)} - \left(\tau_t M(x_t^{(s)} - y^{(s)}) + \sum_i P_{t,i}^T \mathrm{diag}(w_{t,i}) \phi_{t,i}(P_{t,i} x_t^{(s)})\right)$$

The gradient of the loss function with regard to the parameters $\{\tau_t, \alpha_{t,i}, \beta_{t,i}, p_{t,i}\}$ may be calculated based on the chain rule. A good result can be obtained by several steps of operation.

The example embodiment of the information process apparatus related to the training stage is described above, in which the problem of guided depth image restoration is represented as the weighted analysis representation model, and parameters of the model are derived based on the training data during the training stage. In addition, according to some embodiments, the parameters may include parameters related to the specific task. These parameters are outputted for use in a respective depth image restoration process. In addition, for ease of solving the model, in some embodiments, solving may be performed in an iterative manner, wherein the stage-wise model parameters are learned based on the training data.

In describing the embodiment of the above information processing apparatus, obviously some methods and processes are also disclosed. Next, an explanation of the information processing method according to an embodiment of the present disclosure is given without repeating the details described above.

Figure 2:
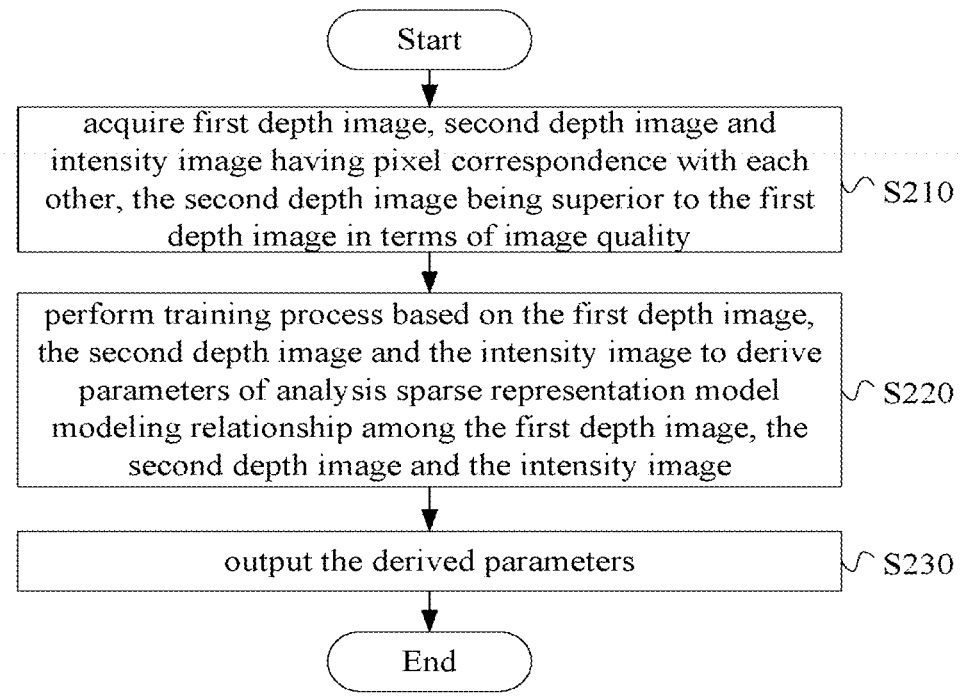
FIG. 2 is a flowchart showing a process example of an information processing method according to an embodiment of the present disclosure.

FIG. 2 shows a process example of an information processing method according to an embodiment. The method corresponds to the training stage described above for deriving parameters of the sparse representation model.

In step S210, a first depth image, a second depth image and an intensity image having a pixel correspondence with each other are acquired, the second depth image being superior to the first depth image in terms of image quality.

In step S220, a training process is performed based on the first depth image, the second depth image and the intensity image to derive parameters of an analysis sparse representation model modeling a relationship among the first depth image, the second depth image and the intensity image.

In step S230, the derived parameters are outputted.

The information processing apparatus and the information processing method of the embodiments related to the training stage are described above. Next, embodiments related to the testing (application) stage are explained. As described above, the testing stage may also be performed by an apparatus performing the training stage. Alternatively, the testing stage may be performed by an additional apparatus. For example, the testing stage may be performed on user side. Correspondingly, the information processing apparatus performing the testing stage may include a user equipment, for example, a personal computer (such as a desktop computer and a laptop computer), a work station, a game machine (such as a motion sensing game machine), a television, a mobile terminal (such as a smart phone, a tablet computer and a portable game terminal), a camera device (such as a camera and a monitor) or the like.

Figure 3:
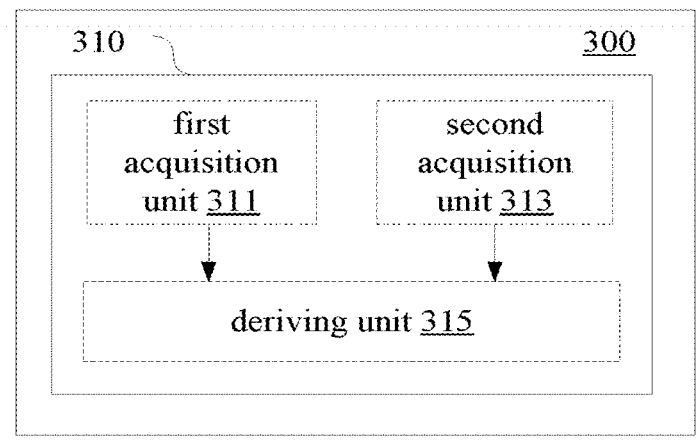
FIG. 3 is a block diagram showing a configuration example of an information processing apparatus according to another embodiment of the present disclosure.

As shown in FIG. 3, an information processing apparatus 300 according to an embodiment includes a processing circuitry 310. For example, the processing circuitry 310 may be implemented as a specific chip, a chipset or a CPU.

The processing circuitry 310 includes a first acquisition unit 311, a second acquisition unit 313 and a deriving unit 315. It should be noted that, although each unit is shown in a form of a functional block in the drawing, it should be understood that, functions of the above units may also be realized by the processing circuitry 310 as integral, but not necessarily implemented by actual discrete components. In addition, although the processing circuitry 310 is shown by one block in the diagram, the information processing apparatus 300 may include multiple processing circuitries, and functions of the units may be distributed among multiple processing circuitries, so that multiple processing circuitries perform these functions by cooperation.

The first acquisition unit 311 is configured to acquire parameters of an analysis sparse representation model modeling a relationship among a first depth image, a second depth image and an intensity image having a pixel correspondence with each other, wherein the second depth image being superior to the first depth image in terms of image quality, and the parameters being derived by a training process performed based on training images.

For example, the parameters are derived in a manner as that in the embodiment of the training stage described above, and the first acquisition unit 311 may acquire pre-stored parameters from a storage media, for example.

The second acquisition unit 313 is configured to acquire an input depth image and an input intensity image. Different from the above first depth image, the second depth image and the intensity image as the training images, for example, the input depth image and the input depth image may be images acquired at user side. For example, the input depth image is a depth image obtained by a depth image acquisition device on user side and needs to be improved in terms of image quality.

The deriving unit 315 is configured to derive, based on the input depth image and the input intensity image, an estimated depth image which is superior to the input depth image in terms of image quality using the model.

Since a complex relationship between the depth image and the intensity image can be well represented using the model determined based on the parameters acquired by the first acquisition unit 311, the deriving unit 315 can perform guided depth image restoration more accurately, so as to improve a quality of the depth image acquired by the second acquisition unit 313.

In addition, according to an embodiment, the parameters acquired by the first acquisition unit 311 may include parameters derived by a stage-wise training process, that is, the parameters may include parameters derived by each stage of training process. In addition, according to an embodiment, the parameters derived by each stage of training process acquired by the first acquisition unit 311 may include a parameter related to an estimation reliability of the stage of training process. Correspondingly, the deriving unit 315 may be configured to obtain a high-quality depth image by a stage-wise process based on the parameters derived by each stage of training process.

Next, a process in which the deriving unit 315 derives the estimated depth image is explained in conjunction with a specific example. In the following example, symbols corresponding to those in the example given for the embodiment of the training stage above are used, and repeated explanation of certain details is omitted.

In the following example, it is assumed a process that the first acquisition unit 311 has acquired the parameters derived by the stage-wise training process, for example, $\{\tau_t, \alpha_{t,i}, \beta_{t,i}, p_{t,i}\}$, and the deriving unit 315 derives the estimated depth image in a stage-wise manner. However, in the case that the first acquisition unit 311 has acquired a non-stage-wise parameter set of the model such as $\{\alpha_i, \beta_i, p_i\}$, the deriving unit 315 may derives the estimated depth image directly using the model determined by the parameter set in a non-stage-wise manner.

With y representing the input depth image acquired by the second acquisition unit 313, and x representing the estimated depth image derived by the deriving unit 315, the estimated depth image is derived in a stage-wise manner by the following Equation (8), $$x_{t+1} = x_t - (\tau_t M(x_t - y) + \Sigma_i P_{t,i}^T \text{diag}(w_{t,i}) \phi_{t,i}(P_{t,i} x_t)) \quad \text{Equation (8)}$$

That is, in the first stage, an estimated depth image of the first stage is derived based on the input depth image and the input intensity image using the parameters corresponding to the first stage, where x is set to be y initially, that is, $x_0 = y$;

in the t-th stage, an estimated depth image ($x_{t|1}$) of the t-th stage is derived based on the input depth image, the input intensity image and the estimated depth image ($x_t$) derived in the (t−1)-th stage, using the parameters corresponding to the t-th stage; and in the (t+1)-th stage, an estimated depth image of the (t+1)-th stage is derived based on the input depth image, the input intensity image and the estimated depth image ($x_{t+1}$) derived in the t-th stage, using the parameters corresponding to the (t+1)-th stage.

In the above process, an effect of the input depth image is included in a weight $w_{t,i}$, and reference may be made to the above Equation (4) and explanation thereof. In addition, Equation (8) in the above example may be used as an example of the estimation function 1126 described above with reference to FIG. 11.

Figure 12:
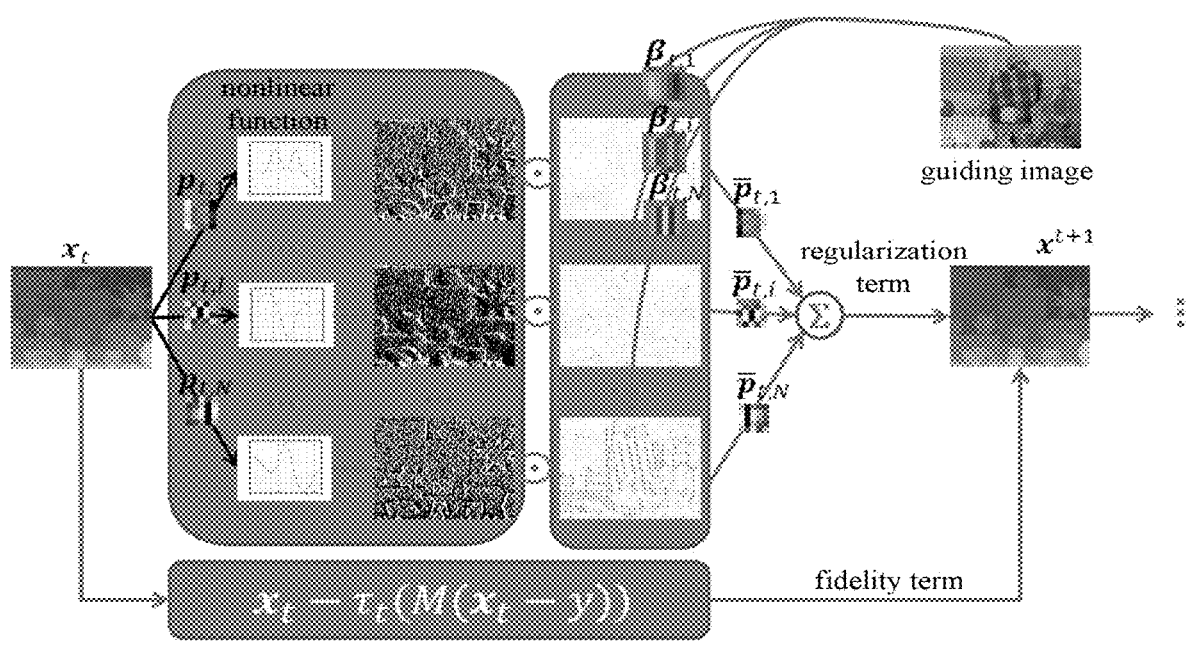
FIG. 12 is a schematic diagram for illustrating a stage-wise guided depth image restoration process according to an embodiment of the present disclosure.

FIG. 12 schematically shows a process in one stage. In the t-th stage: firstly, a set of nonlinear functions are applied to a filter response $\{p_{t,i} x_t\}_{i=1 \ldots N}$; then, a weighted graph is generated based on a guided intensity image to introduce local structural information of a scenario; and finally, different components are combined to derive a new depth image estimation $x_{t+1}$ which is an enhanced version of current estimation $x_t$.

In addition, according to an embodiment, parameters acquired by the first acquisition unit 311 may include parameters derived by a training process performed in terms with each of multiple image qualities. For example, the parameters include parameters specific to task and derived based on the task-driven training manner described above.

Correspondingly, the deriving unit 315 may be configured to perform a task-specific depth image optimization, that is, an estimated depth image is derived using the model determined based on corresponding parameters, with the estimated depth image being superior to the input depth image in terms of corresponding image quality.

Next, an effect of depth image optimization of the example embodiment is described by taking a super-resolution application of the depth image and a hole-filling application of the depth image as examples. Specific parameter settings in the following examples are merely illustrative but not restrictive.

(1) Super-Resolution Application of Depth Image

In the example embodiment, the training data set is derived by selecting a pair of a depth image and an intensity image of 18 in the Middlebury data set (see document [3]: "Hirschmuller, H., Scharstein, D.: Evaluation of cost functions for stereo matching. In: Proceedings of the IEEE Conference on Computer Vision and Pattern Recognition, 2007") and extracting 250 small images with 72×72 pixels. Low-resolution depth images are generated using a high-quality data set. To test different scaling factors, high-resolution depth images are down-sampled to 36×36, 18×18 and 9×9. Then, the training processes are performed with the scaling factors 2, 4 and 8, respectively. Stage numbers of 4, 5 and 6 are set for the scaling factors 2, 4 and 8, respectively.

The models derived by training are applied to the remaining three data sets (Art, Books and Moebius) in the Middlebury data set which are not used in the training set, so as to improve the resolution of depth image.

Figure 13A:
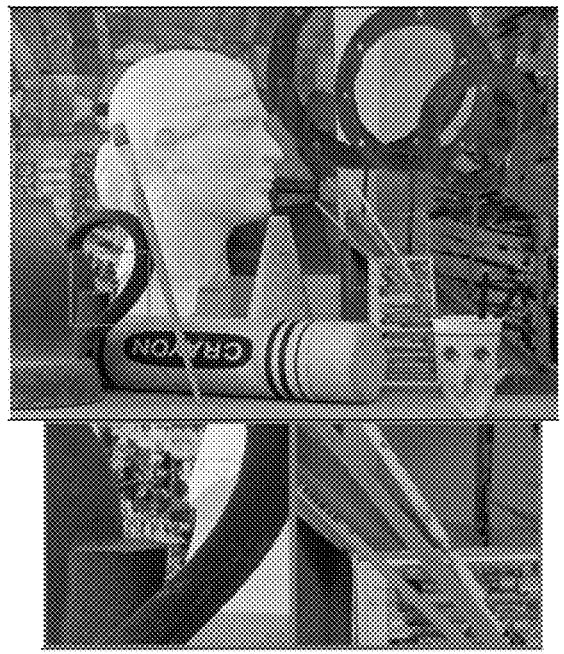
FIG. 13A to FIG. 13D show examples of an effect of resolution improvement obtained by a solution according to an example embodiment of the present disclosure.
Figure 13B:
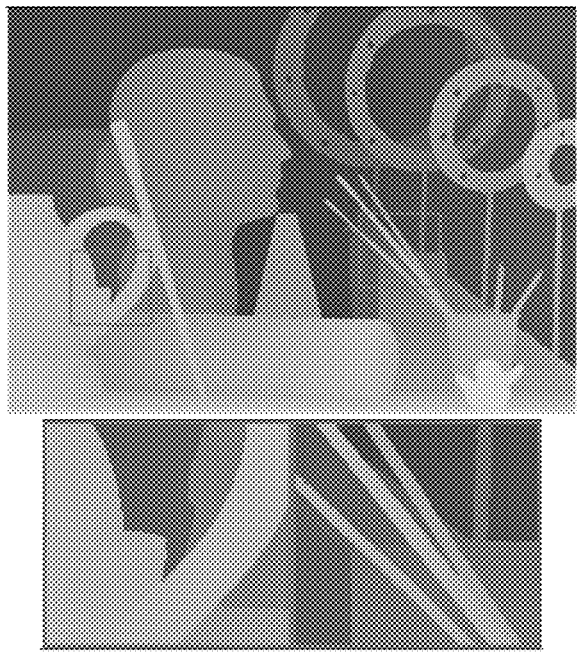
Figure 13C:
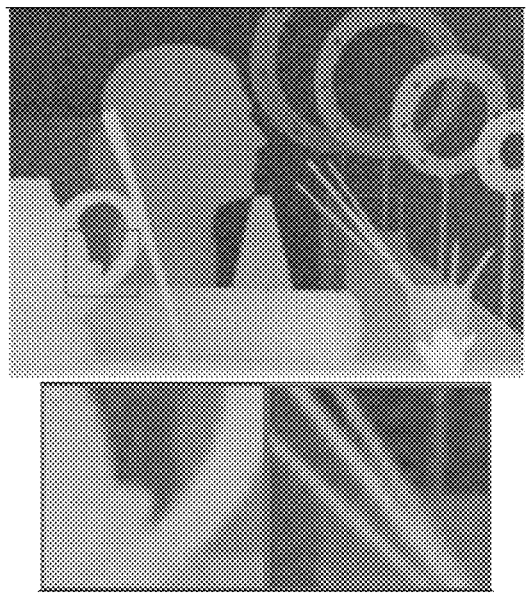
Figure 13D:
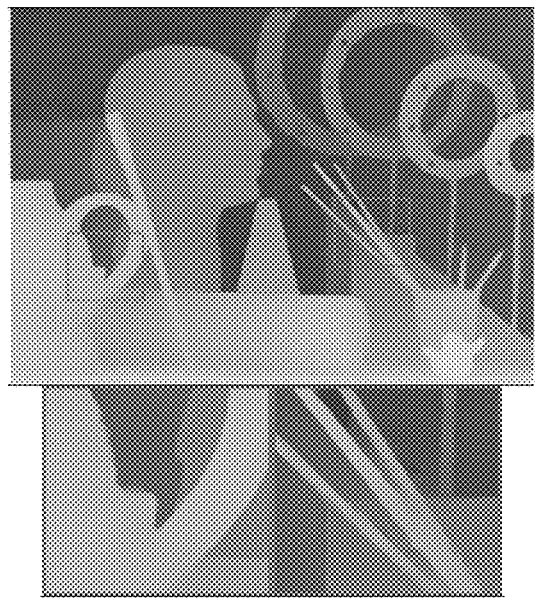

FIG. 13A to FIG. 13D show effects of resolution improvement obtained by the above example manners. FIG. 13A shows the intensity image and local regions thereof; FIG. 13B shows a high-resolution depth image and corresponding local regions; FIG. 13C shows a low-resolution depth image (derived by using bilinear interpolation) and corresponding local regions; and FIG. 3D shows the depth image with improved resolution derived by the example embodiment and corresponding local regions. It can be seen that, as compared with the low-resolution depth image, resolution improvement obtained by the example embodiment restores the depth image well.

(2) Hole-Filling Application of Depth Image

In the example embodiment, the same training date as the example embodiment of super-resolution application of the depth image is used, and the hole-filling model is trained in a manner as that in the example embodiment, so that holes in the low-quality depth image are minimized. Holes in the training images and the testing images are generated by using an unbalance sampling method, and there is higher probability that the hole occurs in an edge region.

FIG. 14A to FIG. 14D show effects of hole-filling obtained in the above example manner. FIG. 14A shows the intensity image and local regions thereof; FIG. 14B shows a low-quality (that is, including holes) depth image and corresponding local regions; FIG. 14C shows a high-quality depth image and corresponding local regions; and FIG. 14D shows hole-filled depth image obtained in a manner as that in the example embodiment and corresponding local regions. It can be seen that, as compared with the low-quality depth image, the depth image is well restored by hole-filling obtained in a manner as that in the example embodiment.

In addition, according to some embodiments, the information processing apparatus may include an image acquisition device. Moreover, for example, the depth image and the intensity image acquired by a second acquisition unit 313 may be an image acquired by the image acquisition device in real time.

Figure 4:
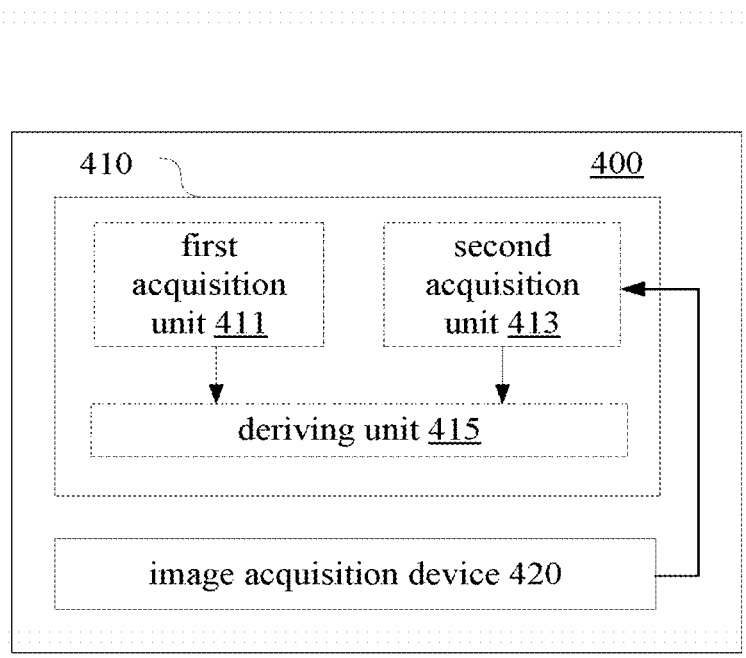
FIG. 4 is a block diagram showing a configuration example of an information processing apparatus according to yet another embodiment.

FIG. 4 shows a configuration example of an information processing apparatus according to an embodiment. As shown in FIG. 4, an information processing apparatus 400 includes a processing circuitry 410, which includes a first acquisition unit 411, a second acquisition unit 413 and a deriving unit 415. The information processing apparatus 400 further includes an image acquisition device 420 configured to acquire a depth image and an intensity image of an object as an input depth image and an input intensity image, respectively. The second acquisition unit 413 acquires the input depth image and the input intensity image from the image acquisition device 420. Besides, configurations of the first acquisition unit 411, the second acquisition unit 413 and the deriving unit 415 in other aspects are similar to those of respective units explained referring to FIG. 3, and hence, repeated description thereof is omitted here.

For example, the image acquisition device 420 may include an RGB-D data acquisition device including a depth image capturing device such as a depth sensor and an intensity image capturing device such as a color camera. For example, the color camera can collect continuous color image sequence, and may be any camera on the market. The depth sensor collects continuous depth image sequence, and may be a structured light depth acquisition apparatus like Kinect, or a ToF camera.

The image acquiring device 420 can provide a depth image and an intensity image having a pixel correspondence and collected simultaneously. The pixel correspondence between the depth image and the intensity image may be determined by using camera calibration technology, and simultaneous collection may be ensured for example by a hardware synchronization circuitry. An output of the RGB-D data acquisition module, which is a synchronized color and depth image sequence, is also referred to as RGB-D sequence or RGB-D data stream.

In addition, according to an embodiment, an imaging object may be a person, and the information processing apparatus may realize a function of a human-machine interface by object identification, for example, used for a controller-free human-machine interaction interface. In addition, application examples of the human-machine interface include are but not limited to: Faceshift, which is a product which analyze a human face based on depth data, and then transfer a face expression of the person onto a virtual character; a motion sensing game machine such as Xbox 360 can analyze and identify an action of the person based on the depth data to control an action of a game character; an algorithm of gesture recognition may be integrated on a smart television for helping the user to control the television. An embodiment involving the human-machine interface according to the present disclosure may be combined with this type of example application to improve the effect of the above application by improving the quality of depth image.

Figure 5:
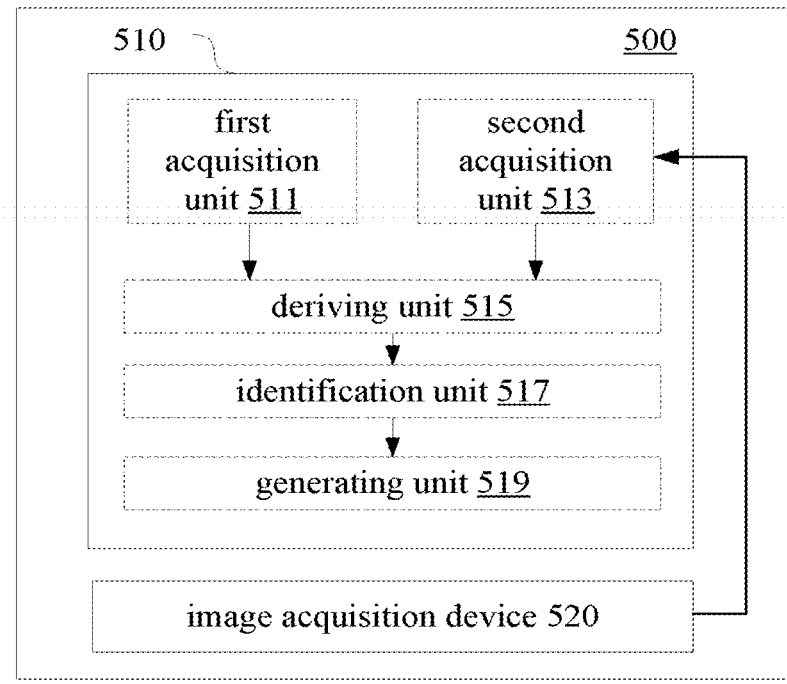
FIG. 5 is a block diagram showing a configuration example of an information processing apparatus according to still another embodiment.

As shown in FIG. 5, the information processing apparatus 500 according to the embodiment includes a processing circuitry 510 and an image acquisition device 520. The processing circuitry 510 includes a first acquisition unit 511, a second acquisition unit 513, a deriving unit 515, an identification unit 517 and a generating unit 519. The first acquisition unit 511, the second acquisition unit 513, the driving unit 515 and the image acquisition device 520 have configurations similar to those of the embodiments described above, and repeated explanation thereof is omitted here.

The identification unit 517 is configured to identify, for example, a face expression, an action or a gesture of a person as the imaging object, based on the input intensity image acquired by the image acquisition device 520 and/or the estimated depth image derived by the deriving unit 515.

The identification processing of the identification unit 517 may be implemented based on known technology, such as deep neural network, in the field of pattern recognition.

The generating unit 519 may be configured to generate a corresponding operation instruction based on the face expression, action (for example, including an action of a part of or the entire human body) or gesture identified by the identification unit 517.

Furthermore, in addition to the function of human-machine interface, depth image processing according to an embodiment of the present disclosure may also be used for 3D image reconstruction.

Figure 6:
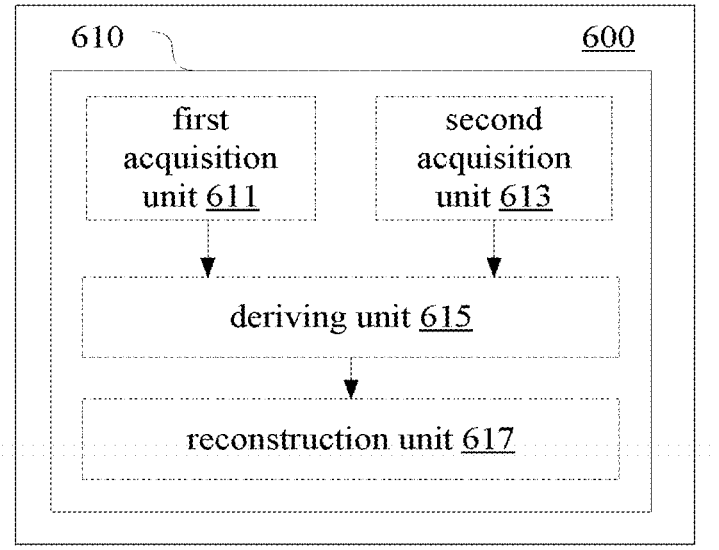
FIG. 6 is a block diagram showing a configuration example of an information processing apparatus according to yet another embodiment.

As shown in FIG. 6, an information processing apparatus 600 according to an embodiment includes a processing circuitry 610, which includes a first acquisition unit 611, a second acquisition unit 613, a deriving unit 615 and a reconstruction unit 617. The first acquisition unit 611, the second acquisition unit 613 and the deriving unit 615 have configurations similar to those of the embodiments described above, and repeated explanation thereof is omitted here.

The reconstruction 617 is configured to perform a 3D reconstruction process of an object based on the input intensity image acquired by the second acquisition unit 613 and/or the estimated depth image derived by the deriving unit 615.

For example, the 3D reconstruction process may include depth fusion and/or texture mapping.

Texture mapping refers to disposing a texture feature of an object to a corresponding position of a 3D model, the texture feature including, for example, color, illumination, detailed change of a surface structure, so that the effect of the surface of 3D model is more realistic.

A 3D model of an item or a scenario may be obtained by using the depth fusion technology if a given depth image sequence is obtained by photographing the item or scenario at different angles. For fusion of depth images, it is required to know the attitude of each depth image when being captured. In the case that two continuous frames of depth images have little difference in gesture, a photographing attitude may be acquired from the depth images by using an iterative closest point method, then multiple depth images are fused into an complete 3D model based on attitudes corresponding to the depth images. For example, the depth fusion technology includes a visibility-based method, a total-variance-based method, a probability-based method and an octree-based method.

The information processing apparatus according to an embodiment of the present disclosure and example applications thereof are explained above in conjunction with the example embodiments. However, the aspects to which the embodiments of the present disclosure can be applied are not limited to the above, and may include various application fields related to depth image.

Figure 7:
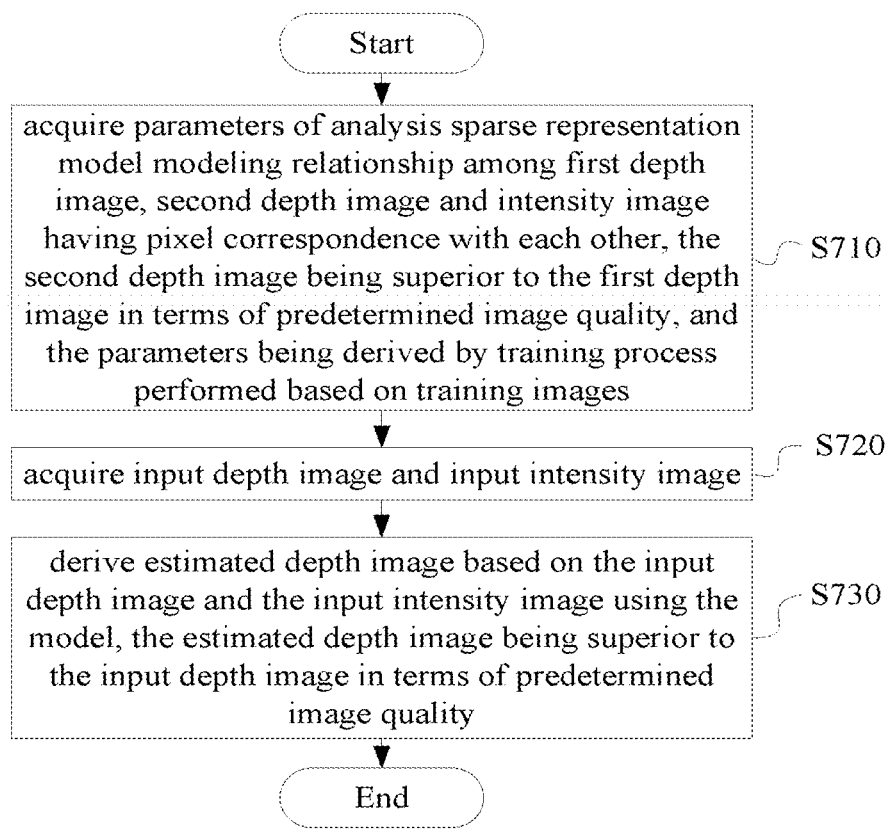
FIG. 7 is a flowchart showing a process example of an information processing method according to another embodiment of the present disclosure.

FIG. 7 shows a process example of an information processing method according to an embodiment.

In step S710, parameters of an analysis sparse representation model are acquired, wherein the model modeling a relationship among a first depth image, a second depth image and an intensity image having a pixel correspondence with each other, the second depth image being superior to the first depth image in terms of image quality, and the parameters being derived by a training process performed based on training images.

In step S720, an input depth image and an input intensity image are acquired.

In step S730, an estimated depth image is derived based on the input depth image and the input intensity image using the model, the estimated depth image being superior to the input depth image in terms of image quality.

In addition, the embodiment of the present disclosure may further include the following information processing apparatus.

Figure 8:
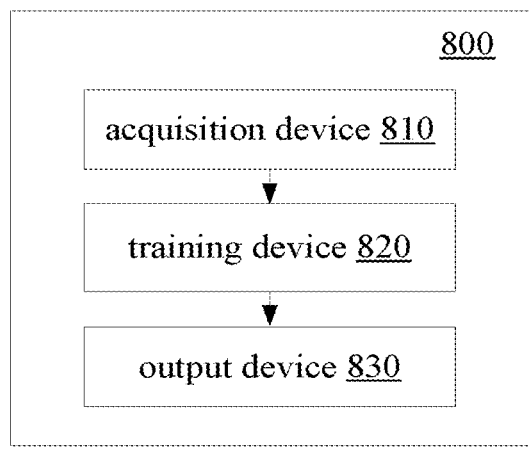
FIG. 8 is a block diagram showing a configuration example of an information processing apparatus according to an embodiment of the present disclosure.

As shown in FIG. 8, an information processing apparatus 800 according to an embodiment includes: an acquisition device 810 configured to acquire a first depth image, a second depth image and an intensity image having a pixel correspondence with each other, wherein the second depth image being superior to the first depth image in terms of image quality; a training device 820 configured to perform a training process based on the first depth image, the second depth image and the intensity image to derive parameters of an analysis sparse representation model modeling a relationship among the first depth image, the second depth image and the intensity image; and an output device 830 configured to output the derived parameters.

Figure 9:
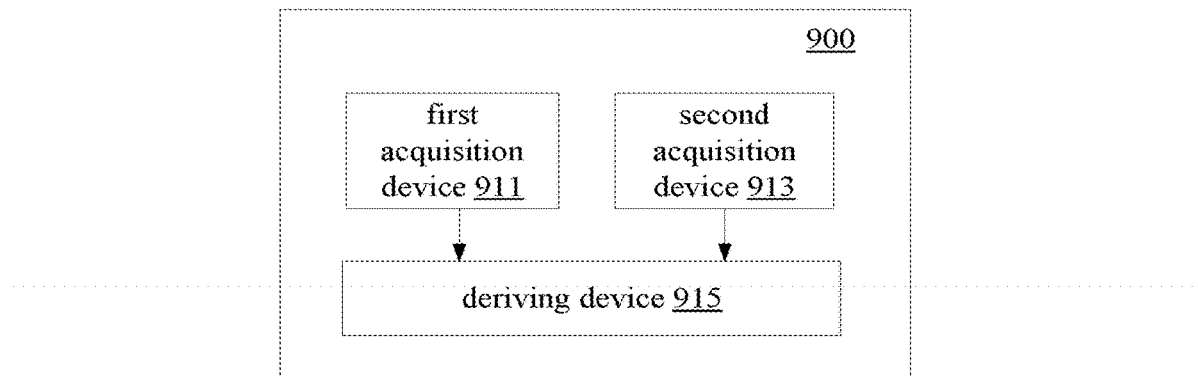
FIG. 9 is a block diagram showing a configuration example of an information processing apparatus according to another embodiment of the present disclosure.

As shown in FIG. 9, an information processing device 900 according to another embodiment includes: a first acquisition device 911 configured to acquire parameters of an analysis sparse representation model modeling a relationship among a first depth image, a second depth image and an intensity image having a pixel correspondence with each other, wherein the second depth image being superior to the first depth image in terms of image quality, and the parameters being derived by a training process performed based on training images; a second acquisition device 913 configured to acquire an input depth image and an input intensity image; a deriving device 915 configured to derive an estimated depth image based on the input depth image and the input intensity image using the model, the estimated depth image being superior to the input depth image in terms of image quality.

As an example, each steps of the above-described method and each of constituent modules and/or units of the above-described device may be implemented as software, firmware, hardware, or a combination thereof. In the case that they are implemented as software or firmware, a program constituting the software for implementing the above-described method may be installed from a storage medium or a network to a computer (for example, the general-purpose computer 1000 shown in FIG. 10) having a dedicated hardware structure. The computer can execute various functions when being installed with various programs.

Figure 10:
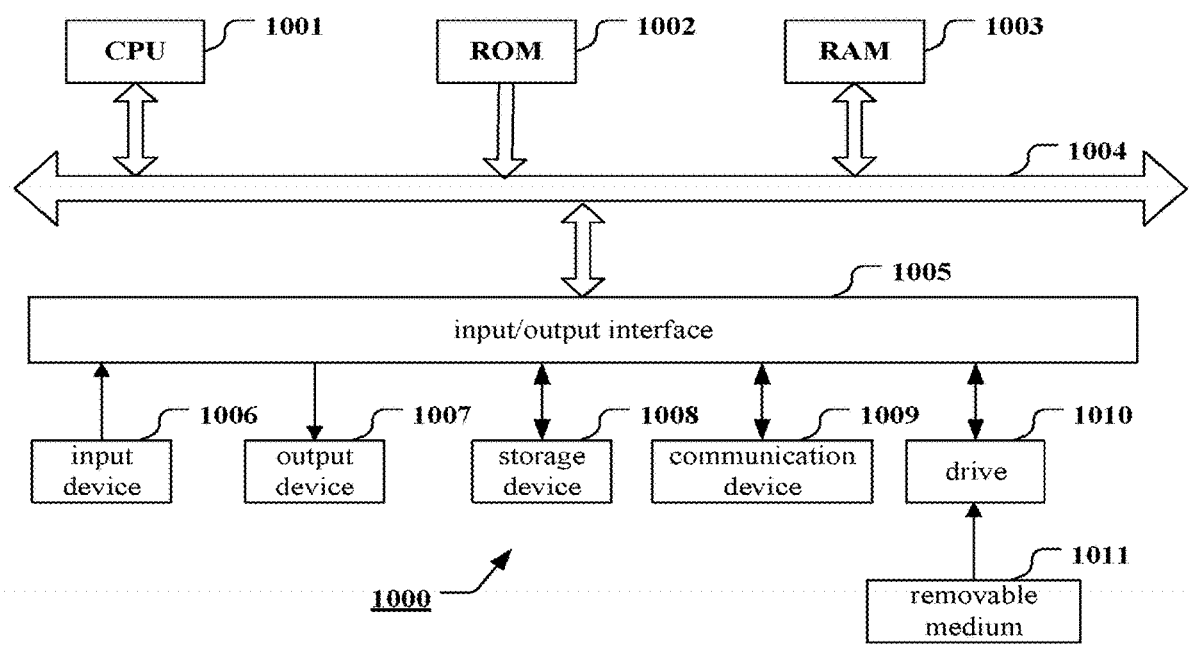
FIG. 10 is a block diagram showing an exemplary structure of a computer for implementing the method and apparatus according to the present disclosure.

In FIG. 10, a computation processing unit (i.e., CPU) 1001 executes various processing according to a program stored in a Read Only Memory (ROM) 1002 or a program loaded to a Random Access Memory (RAM) 1003 from a storage device 1008. In the RAM 1003, data required for the CPU 1001 in executing various processing and the like is also stored as necessary. The CPU 1001, the ROM 1002 and the RAM 1003 are connected to each other via a bus 1004. An input/output interface 1005 is also connected to the bus 1004.

The following components are connected to the input/output interface 1005: an input device 1006 including a keyboard, a mouse and the like, an output device 1007 including a display such as a Cathode Ray Tube (CRT) and a Liquid Crystal Display (LCD), a speaker and the like, the storage device 1008 including a hard disk and the like, and a communication device 1009 including a network interface card such as a LAN card, a modem and the like. The communication device 1009 performs communication processing via a network such as the Internet. If necessary, a drive 1010 may also be linked to the input/output interface 1005. A removable medium 1011 such as a magnetic disk, an optical disk, a magneto-optical disk, a semiconductor memory and the like is mounted on the drive 1010 as necessary such that a computer program read out therefrom is installed in the storage device 1008.

If the series of processing above are implemented in software, a program constituting the software is installed from the network such as the Internet or the storage medium such as the removable medium 1011.

It is understood by those skilled in the art that the storage medium is not limited to the removable medium 1011 shown in FIG. 10 in which the program is stored and which is distributed separately from the device so as to provide the program to the user. Examples of the removable medium 1011 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1002, the hard disk contained in the storage device 1008 or the like. The program is stored in the storage medium, and the storage medium is distributed to the user together with the device containing the storage medium.

Embodiments of the present disclosure further involve a program product having stored therein machine-readable instruction code. When the instruction code is read and executed by the machine, the above-described method according to an embodiment of the present disclosure can be executed.

Correspondingly, the storage medium used for carrying the program product including machine-readable instructions is included in the present disclosure. The storage medium includes but not limited to, a floppy disk, an optical disk, a magneto-optical disk, a memory card, a memory stick and so on.

In the above description of specific embodiments of the present disclosure, the features described and/or illustrated with respect to one embodiment may be used in one or more other embodiments in the same or similar manner as or to that in the embodiment, in combination with features in other embodiments, or replacing features in other embodiments.

It is to be emphasized that the term "comprising/including" as used herein refers to the presence of a feature, element, step or component but does not exclude the presence or addition of one or more other features, elements, steps or components.

In the above embodiments and examples, reference numerals consist of numerals are used to represent each step and/or unit. It will be understood by those skilled in the art that these reference numerals are used for convenience of description and illustration only and are not intended to represent order or any other limit thereof.

In addition, the method of the present disclosure is not limited to be performed in a chronological order described in the specification, but may also be performed in other time-sequentially, in parallel, or independently. Therefore, the order of execution of the methods described in this specification does not limit the technical scope of the present d.

Although the disclosure has been described above with respect to specific embodiments thereof, it is to be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents are intended to be included within the scope of protection of the present disclosure.

The invention claimed is:

1. An information processing apparatus, comprising:
   processing circuitry configured to acquire a first depth image, a second depth image and an intensity image having a pixel correspondence with each other, the second depth image being superior to the first depth image in terms of image quality;

perform a training process based on the first depth image, the second depth image and the intensity image to derive parameters of an analysis sparse representation model modeling a relationship among the first depth image, the second depth image and the intensity image; and output the derived parameters, wherein the model comprises a weight generating function for generating a weight based on the intensity image, the weight generating function is used for affecting a regularization of depth filter response based on structural information in the intensity image.

2. The information processing apparatus according to claim 1, wherein the model comprises a summation of a fidelity term and one or more regularization terms, wherein each of the regularization terms comprises a respective penalty function and a respective weight generating function.

3. The information processing apparatus according to claim 2, wherein the parameters comprise parameters of each of the weight generating functions and parameters of each of the penalty functions.

4. The information processing apparatus according to claim 2, wherein the model comprises an objective function in a form of:

$$\min_x E(x) = \Gamma(x,y) + \Sigma_i \langle w_i(g;\beta_i), \rho_i(P_i x;\alpha_i) \rangle,$$

where x represents the second depth image, y represents the first depth image, g represents the intensity image, $\Gamma(x,y)$ represents the fidelity term, i is the index of regularization term, $\langle \bullet, \bullet \rangle$ represents an inner product, $w_i$ represents the weight generating function, $\beta_i$ is a parameter of the weight generating function, $\rho_i$ represents the penalty function, $P_i x$ represents a filter response, and $\alpha_i$ is a parameter of the penalty function.

5. The information processing apparatus according to claim 4, wherein the training process comprises deriving parameters of each stage of a stage-wise function of $$x_{t+1} = x_t - (\nabla_x \Gamma(x_t,y) + \Sigma_i P_{t,i}^T \mathrm{diag}(w_{t,i}) \phi_{t,i}(P_{t,i} x_t))$$

by calculating a gradient for the objective function, where t is the index of stage, $w_{t,i}$ is an $i^{th}$ weight generating function in a $t^{th}$ stage, $\mathrm{diag}(w_{t,i})$ is a square matrix with diagonal elements being vector $w_{t,i}$, $x_t$ is an estimation of x in a $t-1^{th}$ stage, $\nabla_x \Gamma(x_t,y)$ is the derivative of the fidelity term, $P_{t,i}^T$ represents a filter operation after performing a horizontal up-down flip on a filter, and function $\phi_{t,i}$ is the derivative of the penalty function $\rho_i$.

6. An information processing apparatus, comprising: processing circuitry configured to acquire parameters of an analysis sparse representation model modeling a relationship among a first depth image, a second depth image and an intensity image having a pixel correspondence with each other, the second depth image is superior to the first depth image in terms of image quality, and the parameters is derived by a training process performed based on training images;

acquire an input depth image and an input intensity image; and derive an estimated depth image based on the input depth image and the input intensity image using the model, wherein the estimated depth image is superior to the input depth image in terms of the image quality.

7. The information processing apparatus according to claim 6, wherein the training process comprises a stage-wise training process, the parameters comprise parameters obtained by each stage of training process, and the parameters obtained by each stage of training process comprise a parameter related to a reliability of training result of the stage.

8. The information processing apparatus according to claim 7, wherein the processing circuitry is configured to derive the estimated depth image by a stage-wise estimation process of:

in a $1^{st}$ stage, deriving an estimated depth image of the $1^{st}$ stage based on the input depth image and the input intensity image using the parameters corresponding to the $1^{st}$ stage; and in a $t+1^{th}$ stage, deriving an estimated depth image of the $t+1^{th}$ stage based on the input depth image, the input intensity image and the estimated depth image derived in the $t^{th}$ stage, using the parameters corresponding to the $t+1^{th}$ stage, where t is a natural number.

9. The information processing apparatus according to claim 6, wherein the parameters comprise parameters derived by training processes performed respectively for each of a plurality of aspects of image quality.

10. The information processing apparatus according to claim 6, further comprising:

an image acquisition device configured to acquire an depth image and an intensity image of an object as the input depth image and the input intensity image.

11. The information processing apparatus according to claim 10, wherein the processing circuitry is further configured to:

recognize a face expression, an action or a gesture based on the input intensity image and/or the estimated depth image.

12. The information processing apparatus according to claim 11, wherein the processing circuitry is further configured to generate a corresponding operation instruction based on the recognized face expression, action or gesture.

13. The information processing apparatus according to claim 6, wherein the processing circuitry is further configured to:

perform a 3D reconstruction process of an object based on the input intensity image and/or the estimated depth image, wherein the 3D reconstruction process comprises a depth fusion and/or a texture mapping.

* * * * *